Nov. 14, 1950     L. M. J. FOULKE     2,529,930
TRICYCLE
Filed Feb. 20, 1948
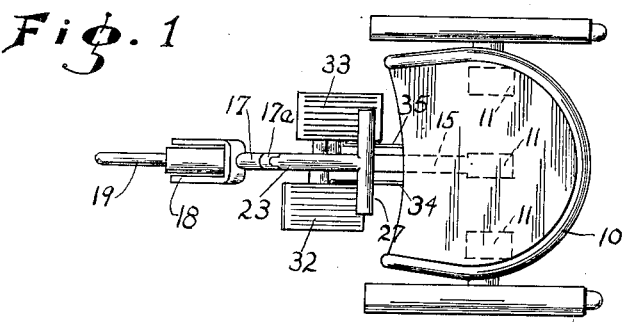
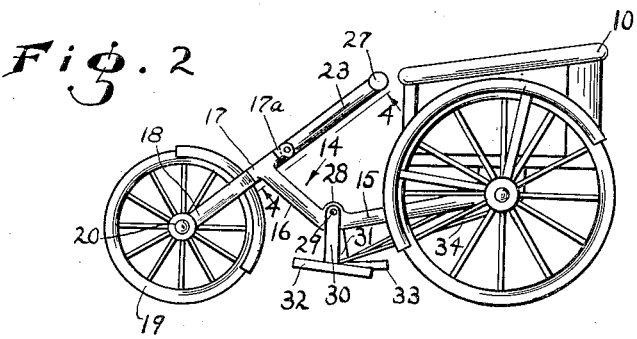
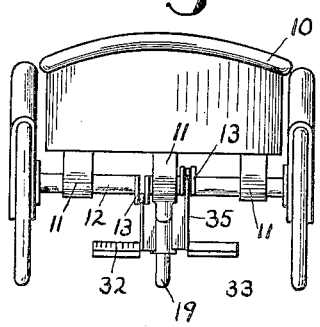
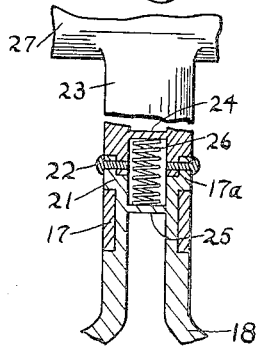
INVENTOR.
LOUISE M. J. FOULKE
BY
*J. Ledermann*
ATTORNEY Patented Nov. 14, 1950

2,529,930

UNITED STATES PATENT OFFICE 2,529,930

TRICYCLE

Louise M. Jones Foulke, Brooklyn, N. Y.

Application February 20, 1948, Serial No. 9,809

1 Claim. (Cl. 280—282)

This invention relates to tricycles, and aims to provide certain new and useful improvements whereby the vehicle is made more efficient and simpler in construction and operation thereby adapting it better to small children.

The above broad as well as additional and more specific objects will become apparent in the following description, wherein characters of reference refer to like-numbered parts in the accompanying drawings. It is to be noted that the drawings are intended for the purpose of illustration only, and that it is neither desired nor intended to limit the invention necessarily to the exact details of construction shown except insofar as they may be deemed essential to the invention.

Referring briefly to the drawings,

Fig. 1 is a plan view of the tricycle of this invention.

Fig. 2 is a side elevational view of the same.

Fig. 3 is a rear elevational view of the tricycle.

Fig. 4 is a fragmentary view taken on the line 4—4 of Fig. 2, in section.

Referring in detail to the drawing, the numeral 10 indicates the seat of the vehicle, from the bottom of which extend spaced brackets 11 which rotatably support a crank shaft 12 having two cranks 13, one on each side of the midpoint of the shaft. The frame 14 of the vehicle comprises a tubular section or member 15 extending forward and slightly downward from the middle bracket 11 along the median line of the vehicle, and an extension section 16 extending forward and upward from the section 15. At its forward end the section 16 is provided with a third section or sleeve 17 extending at approximately right angles thereto, in which a column 17a is pivotally set, and the lower end of the column 17a has a fork 18 in which the single front wheel 19 is rotatably supported at 20. The upper end of the column 17a has spaced ears 21 extending therefrom in which, through the medium of one or more aligned pins 22, the lower flattened end of a tubular steering rod or post 23 is pivotally mounted. The latter has, spaced from its lower extremity, a wall 24 closing the tubular passage therethrough, and the column 17a also has, spaced from its upper extremity, a like wall 25 closing the passage therethrough. A relatively stout coiled spring 26 is loosely mounted in the two opposed sockets thus formed in the sections 17a and 23 between the walls 24 and 25, and although this spring normally urges the post 23 and the column 17a into mutual alignment it is apparent that the post 23 may be readily tilted in either direction about its pivot with a slight effort. The upper end of the steering post 23 is provided with a transverse handle bar 27.

Mounted horizontally in a hump or ear 28 on the frame 14 at the junction of the sections 15 and 16 is a transverse pivot pin 29 which projects through the ear 28 on both sides. A pedal rod 30 is pivotally suspended from one end of this pin, and a similar pedal rod 31 is pivotally suspended from the other end thereof. Like pedals 32 and 33 are rigid or integral with the respective pedal rods 30 and 31. A crank rod 34 has one end deformed into a pivot 35 which pivotally registers in an opening into the pedal 32 and has the other end thereof formed into an eyelet 36 which is connected in an obvious manner with the nearer crank 13. In the same manner the crank rod 37 has one end 35 pivoted to the pedal 33 and the other end 36 connected to the other crank 13. It is to be noted that the two cranks 13 are spaced 180 degrees apart from each other.

When a child sits in the seat 10, he propels the vehicle by means of his feet in an obvious manner to cause the crank rods to move, thereby rotating the crank shaft 12 in a counter-clockwise direction. This action requires a minimum amount of movement and effort on the part of the feet of the child.

The pivotal mounting of the steering post 23 in the manner above described not only permits ready movement of the post upward to provide clearance for the child to mount or dismount, but it also provides ready adjustment of the post to accommodate the size of the child. For instance, a smaller child would prefer to steer with the post 23 moved downward out of alignment with the frame section 17, and a larger child would prefer to have the post moved upward out of the said alignment. It is apparent that steering may be readily accomplished in any of these positions as well as with the post and the section 17 in alignment. The cross bar or handle at the top of the steering rod affords convenience to the child in grasping the steering means.

Obviously, modifications in form and structure may be made without departing from the spirit and scope of the invention.

I claim:

A tricycle comprising a frame having rear wheels thereon, said frame having a cylindrical sleeve on the forward end thereof, a cylindrical column pivotally mounted in said sleeve and extending from both ends thereof, the lower end of said column having a fork thereon, a dirigible wheel rotatably mounted in said fork, a steering post pivotally secured to the upper end of said column, and resilient means normally urging said post into alignment with said column, said column having an axial cylindrical socket in the upper end thereof, said post having an axial cylindrical socket in the lower end thereof, said sockets having the same diameter, said resilient means comprising a coiled spring having approximately one-half the length thereof mounted in one of said sockets and the remainder of the length thereof mounted in the other of said sockets, said spring having a diameter nearly equal to the diameter of said sockets.

LOUISE M. JONES FOULKE.

REFERENCES CITED

The following references are of record in the file of this patent:

UNITED STATES PATENTS

| Number | Name | Date |
|---|---|---|
| 352,503 | Zanger | Nov. 9, 1886 |
| 439,915 | Weston | Nov. 4, 1890 |
| 1,222,354 | Beach | Apr. 10, 1917 |
| 2,191,348 | Lauterbach | Feb. 20, 1940 |